US006928509B2

(12) United States Patent
Surugucchi

(10) Patent No.: US 6,928,509 B2
(45) Date of Patent: Aug. 9, 2005

(54) METHOD AND APPARATUS FOR ENHANCING RELIABILITY AND SCALABILITY OF SERIAL STORAGE DEVICES

(75) Inventor: Krishnakumar Rao Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 10/211,109

(22) Filed: Aug. 1, 2002

(65) Prior Publication Data

US 2004/0024950 A1 Feb. 5, 2004

(51) Int. Cl.[7] .............................................. G06F 13/00
(52) U.S. Cl. ...................... 710/316; 710/312; 710/314; 710/315; 710/317; 710/305; 711/111
(58) Field of Search ................................ 710/305–306, 710/311–317, 36–38, 62–64, 74, 20–21, 7; 711/111–114, 147–151, 168

(56) References Cited

U.S. PATENT DOCUMENTS

| 5,530,960 A | 6/1996 | Parks et al. |
| 5,542,065 A | 7/1996 | Burkes et al. |
| 5,566,345 A | 10/1996 | Ostrowski |
| 5,583,995 A | 12/1996 | Gardner et al. |
| 5,606,672 A | 2/1997 | Wade |
| 5,611,056 A | 3/1997 | Hotchkin |
| 5,664,155 A | 9/1997 | Elko et al. |
| 5,727,181 A | 3/1998 | Beglin et al. |
| 5,828,854 A | 10/1998 | Wade |
| 5,905,885 A | 5/1999 | Richter et al. |
| 5,933,427 A | 8/1999 | Liang |
| 5,944,838 A | 8/1999 | Jantz |
| 5,949,979 A | 9/1999 | Snow et al. |
| 5,953,352 A | 9/1999 | Meyer |
| 6,073,218 A | 6/2000 | DeKoning et al. |
| 6,138,176 A | 10/2000 | McDonald et al. |
| 6,148,414 A | 11/2000 | Brown et al. |
| 6,173,351 B1 | 1/2001 | Garnett et al. |
| 6,185,697 B1 | 2/2001 | Shiraishi |
| 6,192,492 B1 | 2/2001 | Masiewicz et al. |
| 6,199,137 B1 | 3/2001 | Aguilar et al. |
| 6,205,500 B1 | 3/2001 | Sabotta et al. |
| 6,219,753 B1 | 4/2001 | Richardson |
| 6,223,236 B1 | 4/2001 | Kori |
| 6,223,242 B1 | 4/2001 | Sheafor et al. |

(Continued)

OTHER PUBLICATIONS

Elektronik, vol. 49, No. 24, pp. 52–55, "A rapid crossbar switch for interconnection of microcomputers and memory:" The RapidIO, by H. Strass.

(Continued)

Primary Examiner—Paul R. Myers
Assistant Examiner—Raymond N Phan
(74) Attorney, Agent, or Firm—David W. Lynch; Arthur J. Samodovitz

(57) ABSTRACT

A method, system and apparatus for providing interconnective access of a plurality of controllers to a plurality of serial storage devices are provided. Serial storage devices are provided with a serial operative connection to a data communication bridge. The bridge is operatively coupled to a plurality of controllers. The plurality of controllers is provided concurrent targeted connections to the set of serial storage devices. In one embodiment, InfiniBand® technology further increases the scalability and enhances the reliability of a data communication system provided with a plurality of (S-ATA) storage devices. The reliability of the data communication system is enhanced because if one controller should fail, another controller may still achieve and maintain access to the plurality of serial storage devices.

12 Claims, 8 Drawing Sheets

U.S. PATENT DOCUMENTS

| | | | |
|---|---|---|---|
| 6,594,712 B1 * | 7/2003 | Pettey et al. | 710/22 |
| 6,658,521 B1 * | 12/2003 | Biran et al. | 710/315 |
| 6,763,419 B2 * | 7/2004 | Hoese et al. | 709/250 |
| 6,775,719 B1 * | 8/2004 | Leitner et al. | 710/33 |
| 6,807,600 B2 * | 10/2004 | Bissessur et al. | 710/313 |
| 2003/0005231 A1 * | 1/2003 | Ooi et al. | 711/131 |
| 2003/0221061 A1 * | 11/2003 | El-Batal et al. | 711/114 |
| 2004/0162926 A1 * | 8/2004 | Levy | 710/74 |

OTHER PUBLICATIONS

1999 International Symposium on Database Applications in Non–Traditional Environments, Nov. 28–39, 1999, Kyoto, Japan, "Autonomous Disks for Advanced Database Applications", by Haruo Yokota.

Proceedings of Mini/Micro Southeast, Jan. 17–19, 1984, pp. 1–10, "Custom LSI For SCSI Controllers", by Daniel Loski.

\* cited by examiner

METHOD AND APPARATUS FOR ENHANCING RELIABILITY AND SCALABILITY OF SERIAL STORAGE DEVICES

BACKGROUND OF THE INVENTION

1. Field of the Invention

This invention relates in general to data communication between processors and storage devices, and more particularly to a method and apparatus providing simultaneous connection of a plurality of controllers to a plurality of serial storage devices and serial storage device sets.

2. Description of Related Art

The parallel ATA interconnect has been the dominant internal storage interconnect for desktop and mobile computers since originally introduced in the 1980s. Parallel ATA has been used to connect storage devices such as hard drives, DVD and CD drives, and others to the motherboard. Parallel ATA's relative simplicity, high performance, and low cost has made possible the cost/performance ratio that is essential in the mainstream desktop and portable PC market.

However, parallel ATA has a number of limitations that are exhausting its ability to continue increasing performance. For example, in the near future, integrated circuits manufactured on the leading manufacturing processes will not be able to efficiently support 5-volt signaling voltages. Further, parallel ATA, with its 26 signals, requires a 40-pin connector and uses an unwieldy 80-pin ribbon cable to route inside the chassis. This high pin count is problematic for chip design and makes it difficult to route traces on a motherboard. The wide ribbon cable impedes airflow in the chassis, making thermal design more difficult. These issues become especially acute in notebooks and small form factor desktops, servers, and networked storage. Also, parallel ATA disk drives are limited by their signal and power connectors to cable-attached applications and do not facilitate hot-plugging.

Serial advanced technology attachment (S-ATA) is intended to replace today's parallel ATA. Serial ATA is designed to address many of the limitations of parallel ATA, while maintaining 100% software compatibility. This will significantly ease the transition to Serial ATA, as no changes in today's drivers and operating systems should be required. Serial ATA enables the industry to move to thinner cabling, lower pin counts, lower power requirements, higher performance and hot plug capability.

Serial ATA (S-ATA) is intended to become the dominant interface for the desktop disk drive market. With its cost advantages and the ability to hot plug devices, S-ATA also provides great value for servers and redundant array of inexpensive disks (RAID) applications.

However, a couple of significant problems with S-ATA have been identified. The problems arise mainly from S-ATA being a point-to-point technology. Being a point to point technology means that only one controller can attach to a given drive at a time. Additionally, S-ATA requires a single interface port for each drive. Therefore, if the controller should fail, the disk drive becomes inaccessible.

Building large systems that use S-ATA and have access to a plurality of disk drives has been hampered because of these inadequacies. It would be desirable to create a vast data networking system that uses channel based switch fabric architecture having enhanced scalability and performance. Another goal is to overcome the disadvantages of S-ATA and produce a more reliable high speed I/O data transfer environment having excellent throughput and a high level of functionality.

It can be seen that there is a need for a data communication system with vastly increased scalability and enhanced reliability that provides a plurality of controllers simultaneous and independent access to a plurality of serial storage devices.

It can also be seen that there is a need for a device that provides inter-connective access of a plurality of controllers to a plurality of serial storage devices that can be used as the interconnect mechanism to increase the number of S-ATA ports, as well as provide a path from a plurality controllers to the same set of serial storage devices.

SUMMARY OF THE INVENTION

To overcome the limitations in the prior art described above, and to overcome other limitations that will become apparent upon reading and understanding the present specification, the present invention discloses a method and apparatus for providing inter-connective access of a plurality of controllers to a plurality of storage devices to enhance reliability and scalability with serial ATA storage devices.

The present invention solves the above described problems by providing inter-connective access of a plurality of controllers to a plurality of storage devices to enhance reliability and scalability with serial ATA storage devices.

A method in accordance with the principles of the present invention includes providing a plurality of storage controllers, providing a plurality of serial storage devices and coupling the plurality of storage controllers and the plurality of serial storage devices to enable the plurality of storage controllers to have access to any of the plurality of serial storage devices.

A system in accordance with the principles of the present invention includes a plurality of storage controllers, a plurality of serial storage devices and at least one data communication bridge, the bridge coupling the plurality of storage controllers to the plurality of serial storage devices and enabling the plurality of storage controllers to access any of the plurality of serial storage devices.

An apparatus in accordance with the principles of the invention includes a storage system bridge, wherein the storage system bridge provides concurrent targeted connections between a plurality of controllers to a plurality of serial storage devices.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing inter-connective access of a plurality of controllers to a plurality of storage devices to enhance reliability and scalability with serial ATA storage devices. In one embodiment of the present invention, a peripheral device and a CPU are coupled by a packet switching fabric. The devices communicate and operate asynchronously, but the present invention is not limited to asynchronous operation.

The present invention may incorporate a packet switching fabric, such as, InfiniBand® switch fabric, to increase the speed of performance, reliability and scalability. Infini-Band® technology is a fast, packetized, serial input/output architecture in which computing hosts and peripheral devices are linked by a switching network also referred to as a switching fabric. InfiniBand® technology has been advanced by a consortium led by a group of industry leaders (including IBM®). InfiniBand® is being proposed as a solution to some of the problems in existing data transfer methodology. InfiniBand® will dramatically improve performance, reliability and scalability in the next generation of computer hardware. Applying a switch fabric architecture will enable multiple nodes to have high-speed inter-connections through switches.

Figure 1:
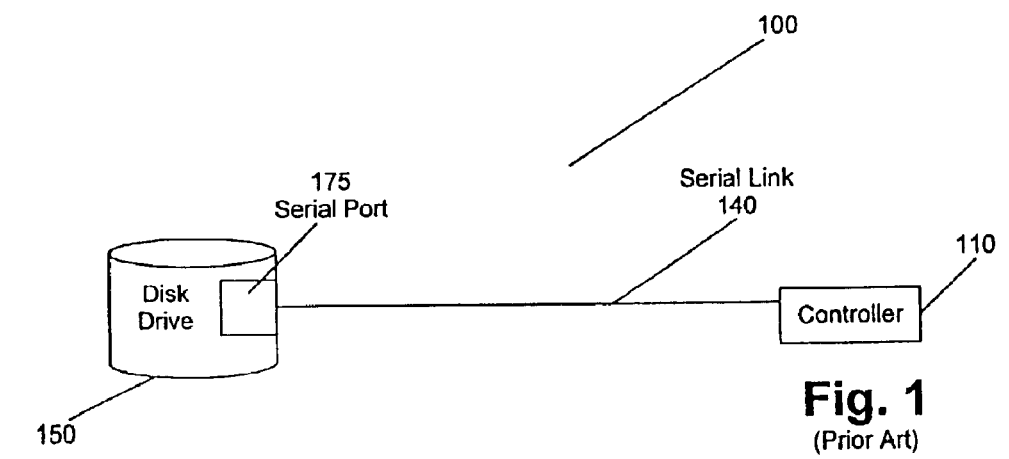
FIG. 1 is a block diagram illustrating a typical serial data communication link between a controller and a disk drive.

FIG. 1 is a block diagram 100 illustrating a typical serial data communication link between a controller and a disk drive. In FIG. 1, a disk drive 150 is shown coupled to a controller 110 via a serial data communication link 140. The serial data communication link 140 is shown coupled to a single serial port 175 on the disk drive 150. Serial data communication requires a single interface port 175 for each drive. FIG. 1 clearly demonstrates that a significant disadvantage arises because the disk drive 150 can only communicate with the single controller 110 to the exclusion of other data requesting devices.

Figure 2:
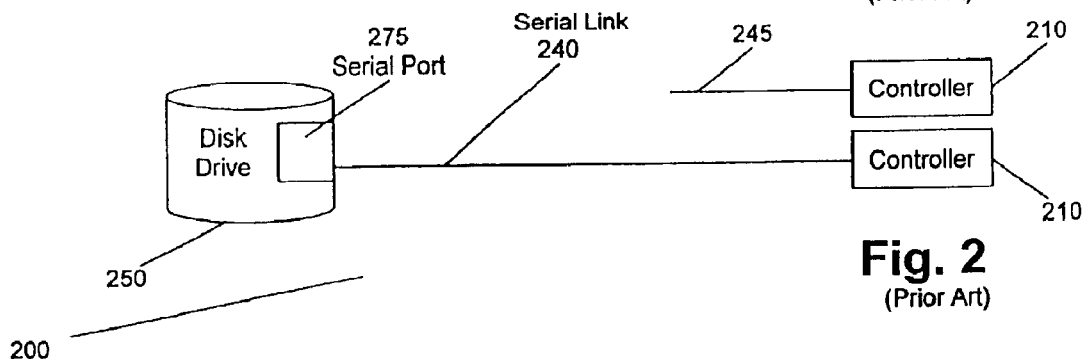
FIG. 2 is a block diagram illustrating the inability of a second controller to connect with a disk drive while the drive is engaged with another controller.

FIG. 2 is a block diagram 200 illustrating the inability of a second controller to connect with a disk drive while the drive is engaged with another controller. In FIG. 2, a disk drive 250 is shown coupled to a controller 210 via a serial data communication link 240. The serial data communication link 240 is shown coupled to a single serial port 275 on the disk drive 250.

Serial data communication requires a single interface port 275 for each drive. Another controller 210 is excluded from making connection with the disk drive 250, as shown by the open connection link 245, while the other controller 210 is attached to the single interface port 275. FIG. 2 clearly demonstrates that a significant disadvantage arises because a disk drive 250 can only attach to a single controller.

Figure 3:
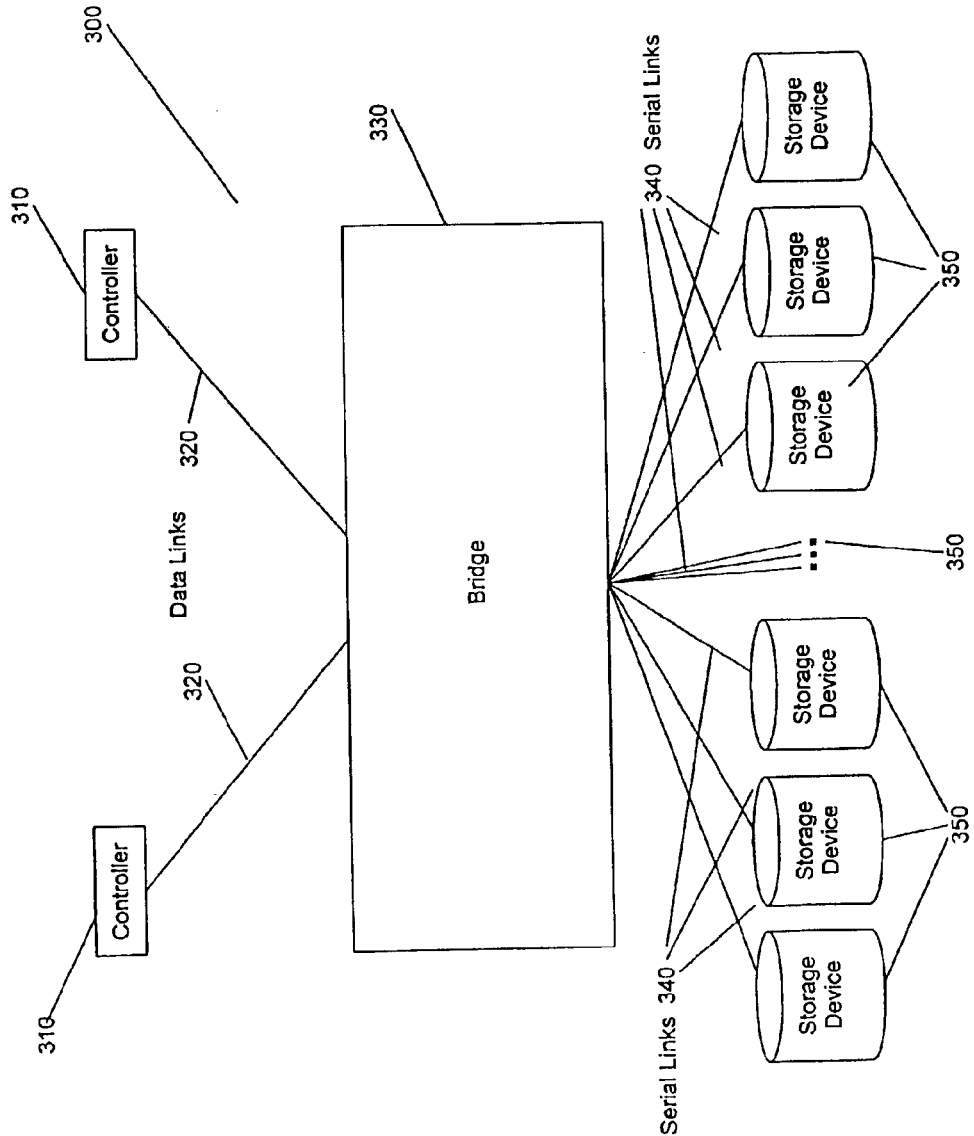
FIG. 3 illustrates a system for providing access of at least two controllers to a plurality of serial storage devices according to an embodiment of the present invention.

FIG. 3 is a block diagram of a data communication system 300 according to the present invention. In FIG. 3, a data communication system 300 is shown including two controllers 310 being operatively coupled to a data communication bridge 330 through data communication links 320. One example of data communication links 320 are controller data communication links, such as, InfiniBand® links. Infini-Band® easily works with an array of transport media and provides virtually unlimited network expansion as well as direct support for copper, optical and printed circuit wiring architectures.

In FIG. 3, a plurality of serial storage devices 350 are shown operatively coupled through serial data communication links 340 to the data communication bridge 330. The serial data communication links 340 may be S-ATA links. The data communication system 300 allows the two controllers 310 to access data from the set of serial storage devices 350. The ability for the two controllers to simultaneously access data from single-port devices is accomplished at least through the data communication bridge 330.

Figure 4:
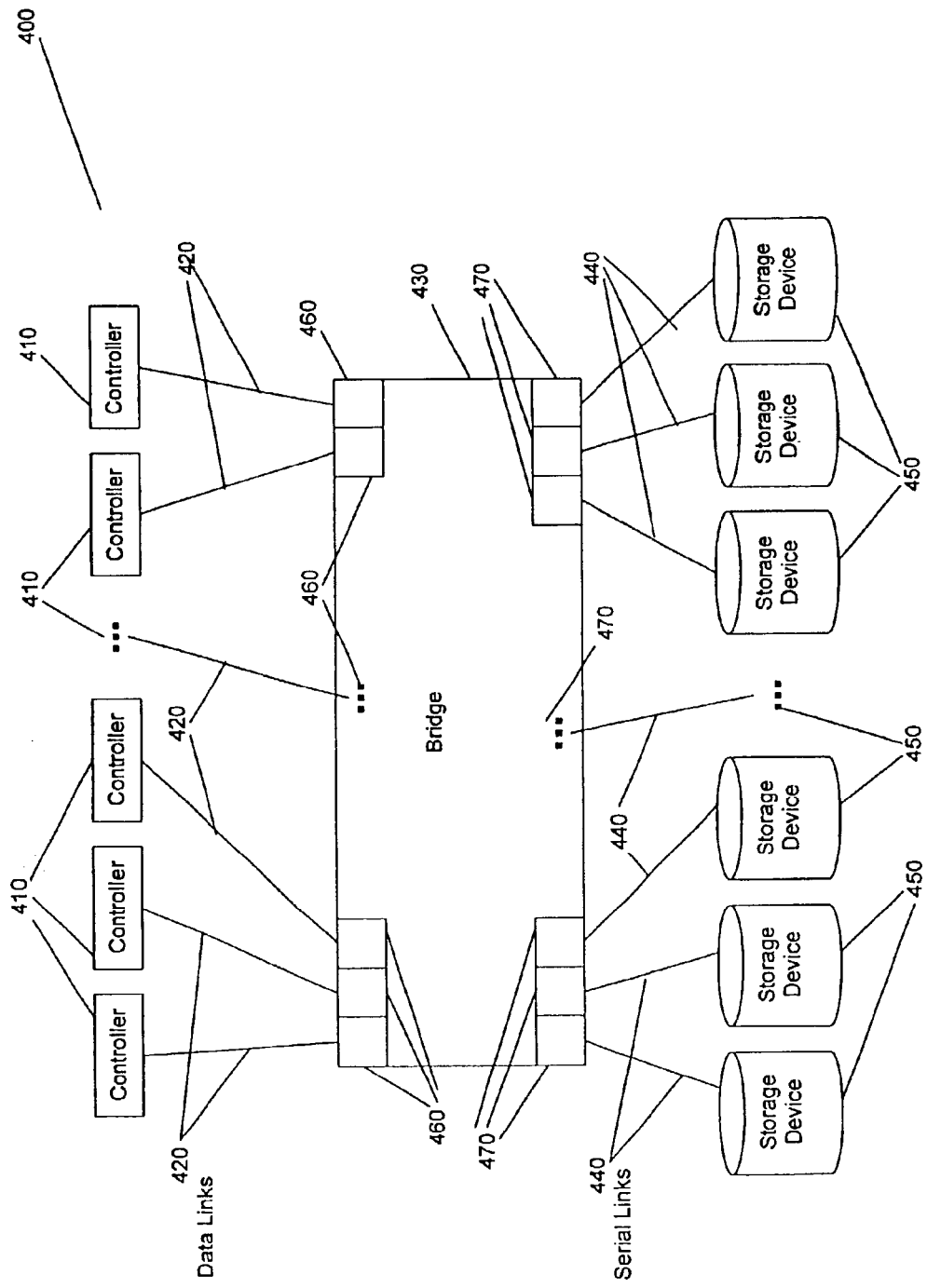
FIG. 4 illustrates a system for providing access of a plurality controllers to a plurality of serial storage devices showing a plurality of controller ports and plurality of serial storage device ports according to an embodiment of the present invention.

FIG. 4 is a block diagram of another data communication system 400 according to the present invention. In FIG. 4, a data communication system 400 is shown including a plurality of controllers 410 being operatively coupled to a data communication bridge 430 through data communication links 420. One example of data communication links 420 are controller data communication links, such as, InfiniBand® links. InfiniBand® links eliminate data flow bottlenecks that are inherent in PCI and PCI-X buses and provide faster and more reliable high speed data networking.

In FIG. 4, the controller data communication links operatively couple the controllers 410 to the data communication bridge 430 via controller data communication ports 460. The controller data communication ports 460 may be Infini-Band® ports. In FIG. 4, a plurality of single-port serial storage devices 450 are shown operatively coupled through serial data communication links 440 to the data communication bridge 430. The serial data communication links 440 may be S-ATA links. The serial data communication links operatively couple the storage devices 450 to the data communication bridge 430 via serial data communication ports 470. The serial data communication ports 470 may be S-ATA ports. The data communication bridge 430 allows the plurality of controllers 410 to access data from the set of single-port storage devices 450. The connectivity of single-port storage devices to multiple controllers is accomplished at least through the data communication bridge 430.

Figure 5:
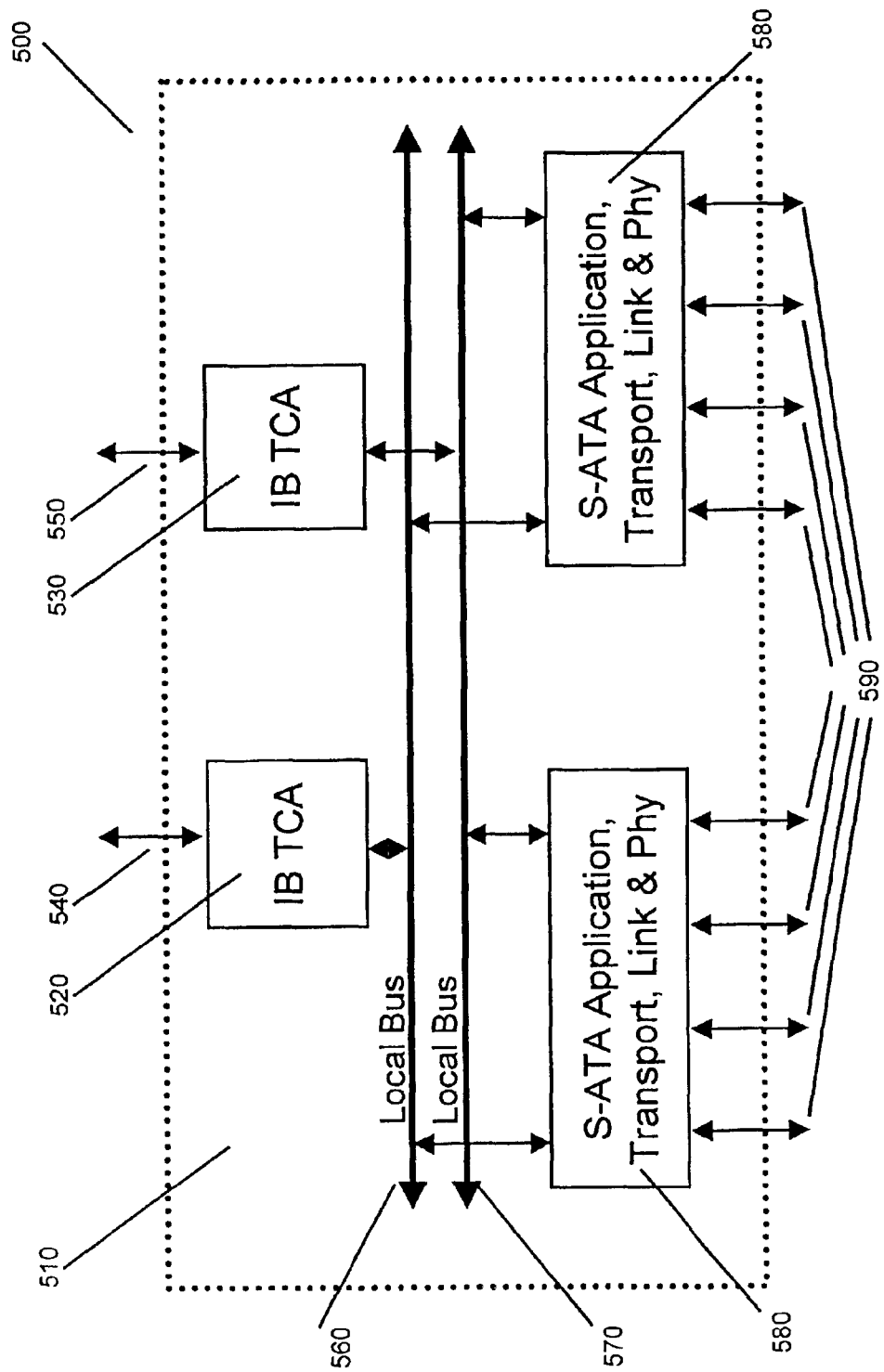
FIG. 5 illustrates a bridge having a plurality of controller ports and a plurality of serial storage device ports that provides simultaneous communication between the controller ports and the device ports according to an embodiment of the present invention.

FIG. 5 is a block diagram 500 of a data communication bridge according to the present invention. In FIG. 5, the data communication bridge 510 is shown including a pair of data communication ports 540 and 550 where the ports are specifically InfiniBand® ports. The two InfiniBand® ports each interface to Target Channel Adapter (TCA) blocks 520 and 530. InfiniBand® TCAs represent the target function in the InfiniBand® architecture, and allow I/O ports such as S-ATA to be connected to an InfiniBand® fabric. TCA block 520 connects to local bus 560 while TCA block 530 connects to local bus 570.

The local buses 560 and 570 are also connected to two 4-port S-ATA blocks 580. Each S-ATA block includes the S-ATA application, transport, link and physical layers. Each S-ATA block 580 is connected to both local buses 560 and 570. The S-ATA blocks have four S-ATA ports 590 each, which can communicate with S-ATA devices.

InfiniBand® port 540 can access every S-ATA port 590 through TCA block 520, local bus 560 and one of the S-ATA blocks 580. Similarly, InfiniBand® port 550 can access every S-ATA port 590 through TCA block 530, local bus 570 and one the S-ATA blocks 580. Further, the architecture of the bridge 510 with two TCAs, two internal local buses, and 4-port S-ATA blocks, facilitates two simultaneous communication interchanges to take place at any time. Thus, for example, while InfiniBand® ports 540 is connected to one of the S-ATA ports 590 and sending drive commands, the other InfiniBand® port 550 may be connected to any of the other S-ATA ports and transferring data between the ports. Each InfiniBand® port has an exclusive path to get to any S-ATA port. The only restriction is that at any given instant, one S-ATA port is connected to at most one InfiniBand® port. If both InfiniBand® ports have to communicate with the same S-ATA port at the same time, one of them will have to wait for the other to finish.

The data communication bridge 510 is provided with two data communication paths, shown generally in FIG. 5, via the first and second local buses 560 and 570, respectively. The local buses 560 and 570 may simultaneously conduct identical data communication functions, such as, upstream communication, a read request for information or a write request of information from a controller to a storage device, or downstream communication, and the transmission of information from a storage device to a controller.

The local buses 560 and 570 may also be simultaneously conducting different data communication functions. For example, the first local bus 560 may be communicating upstream while the second local bus 570 may be communicating downstream or vice versa. The data communication bridge 510 provides a serial operative data connection with each storage device through the serial storage device communication ports 590 and a plurality of controller data communication ports 540 and 550.

Through attachment of a single controller to each controller data communication port 540 or 550 of the data communication bridge 510, plural controllers can now access the set of storage devices simultaneously and independently. Should one of the controllers fail, another controller can still achieve and maintain access to the storage devices. Scalability is achieved through expansion of the number of storage devices and controllers operatively coupled via the data communication bridge 530.

Figure 6:
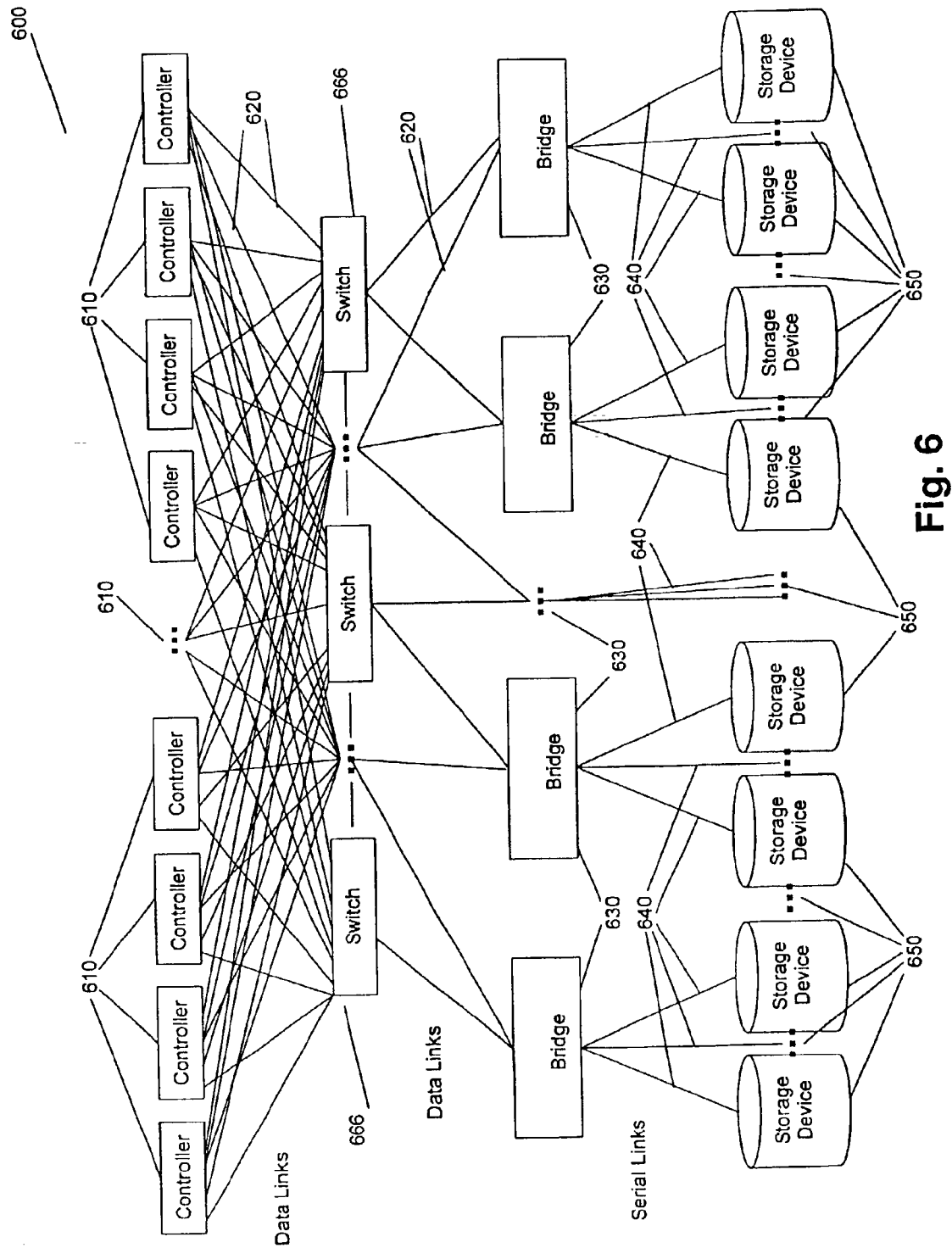
FIG. 6 illustrates a data communication system for providing access of a plurality of controllers to a plurality of serial storage devices showing a plurality of controller ports and plurality of serial storage device ports and the system being provided with switches further expanding access of controllers to the storage devices according to an embodiment of the present invention.

FIG. 6 is a block diagram of another data communication system 600 according to the present invention. In FIG. 6, another data communication system 600 is shown including a plurality of controllers 610 operatively coupled via a plurality of switches 666 and a plurality of controller data communication links 620. The switches 666 may be packet switching fabric switches, such as, InfiniBand® switches and the data communication links 620 may be packet switching fabric, such as InfiniBand®.

As described above, InfiniBand® switches provide a data transfer connection that is able to juggle several messages simultaneously and transmit each as if full network resources were devoted to the message. InfiniBand® easily works with an array of transport media and provides virtually unlimited network expansion as well as direct support for copper, optical and printed circuit wiring architectures.

The switches 666 provide even greater numbers of controllers 610 access to the storage devices 650. The plurality of switches 666 are operatively coupled to a plurality of data communication bridges 630 via data communication links 620 which may be identical to the controller data communication links 620 linking the controllers 610 and the switches 666.

The data communication bridges 630 are operatively coupled to a plurality of storage devices 650 forming a plurality of storage device sets via serial data communication links 640 which may be S-ATA links. By operatively coupling each controller 610 to a port in a switch 666, the scale of the data communication system may be vastly increased. The switch 666 is then coupled to a plurality of bridges 630. The bridges 630 are then operatively coupled via serial links 640 to a plurality of storage devices 650.

An advantage obtained by the present invention is that a plurality of controllers 610 may simultaneously and independently access a set of storage devices 650 independently. If one of the controllers 610 should fail, another controller 610 can still achieve and maintain its access to the storage devices 650. The system scalability becomes unlimited by using switches 666 to expand the number of storage devices 650 and controllers 610 which may be operatively coupled through application of the present invention. The reliability of the data access network is improved because a single controller or single storage device failure is no longer able to bring down the entire system.

Figure 7:
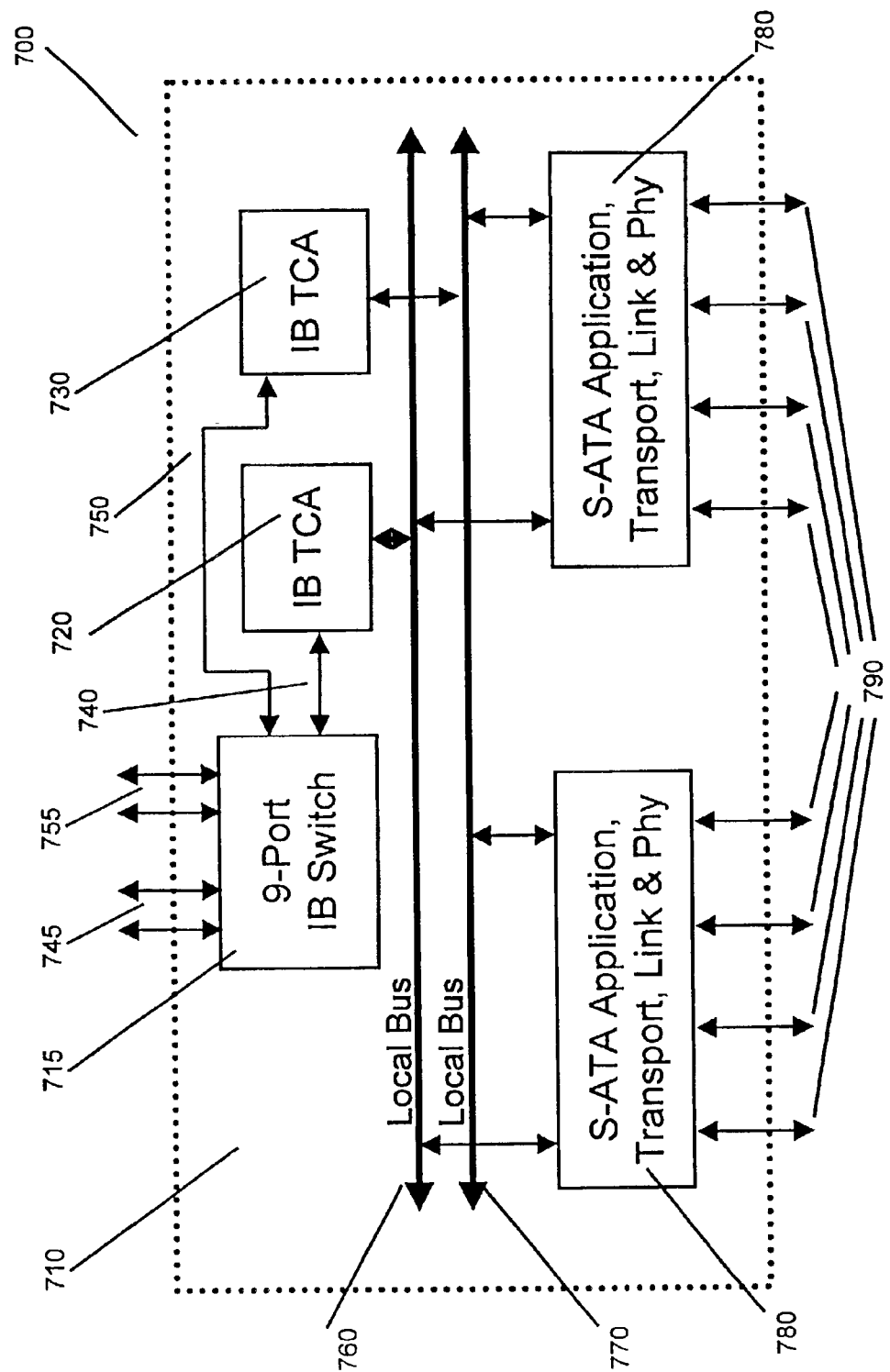
FIG. 7 is a block diagram of a data communication bridge according to the present invention.

FIG. 7 is a block diagram of a data communication bridge 700 according to the present invention. In FIG. 7, the data communication bridge 710 is shown including a pair of data communication ports 740 and 750 where the ports are specifically InfiniBand® ports. The two InfiniBand® ports each interface to Target Channel Adapter (TCA) blocks 720 and 730. As described above, InfiniBand® TCAs represent the target function in the InfiniBand® architecture, and allow I/O ports such as S-ATA to be connected to an InfiniBand® fabric. TCA block 720 connects to local bus 760 while TCA block 730 connects to local bus 770. FIG. 7 also shows how the bridge can include a minimal switch function, e.g., a 9-port IB switch 715, which provides ports 745 and 755. Thus, FIG. 7 shows how the bridge 700 may provide limited scalability at low cost.

The local buses 760 and 770 are also connected to two 4-port S-ATA blocks 780. Each S-ATA block includes the S-ATA application, transport, link and physical layers. Each S-ATA block 780 is connected to both local buses 760 and 770. The S-ATA blocks have four S-ATA ports 790 each, which can communicate with S-ATA devices.

InfiniBand® port 740 can access every S-ATA port 790 through TCA block 720, local bus 760 and one of the S-ATA blocks 780. Similarly, InfiniBand® port 750 can access every S-ATA port 790 through TCA block 730, local bus 770 and one the S-ATA blocks 780. Further, InfiniBand® ports 740 and 750 may be connected through ports 745 and 755.

Figure 8:
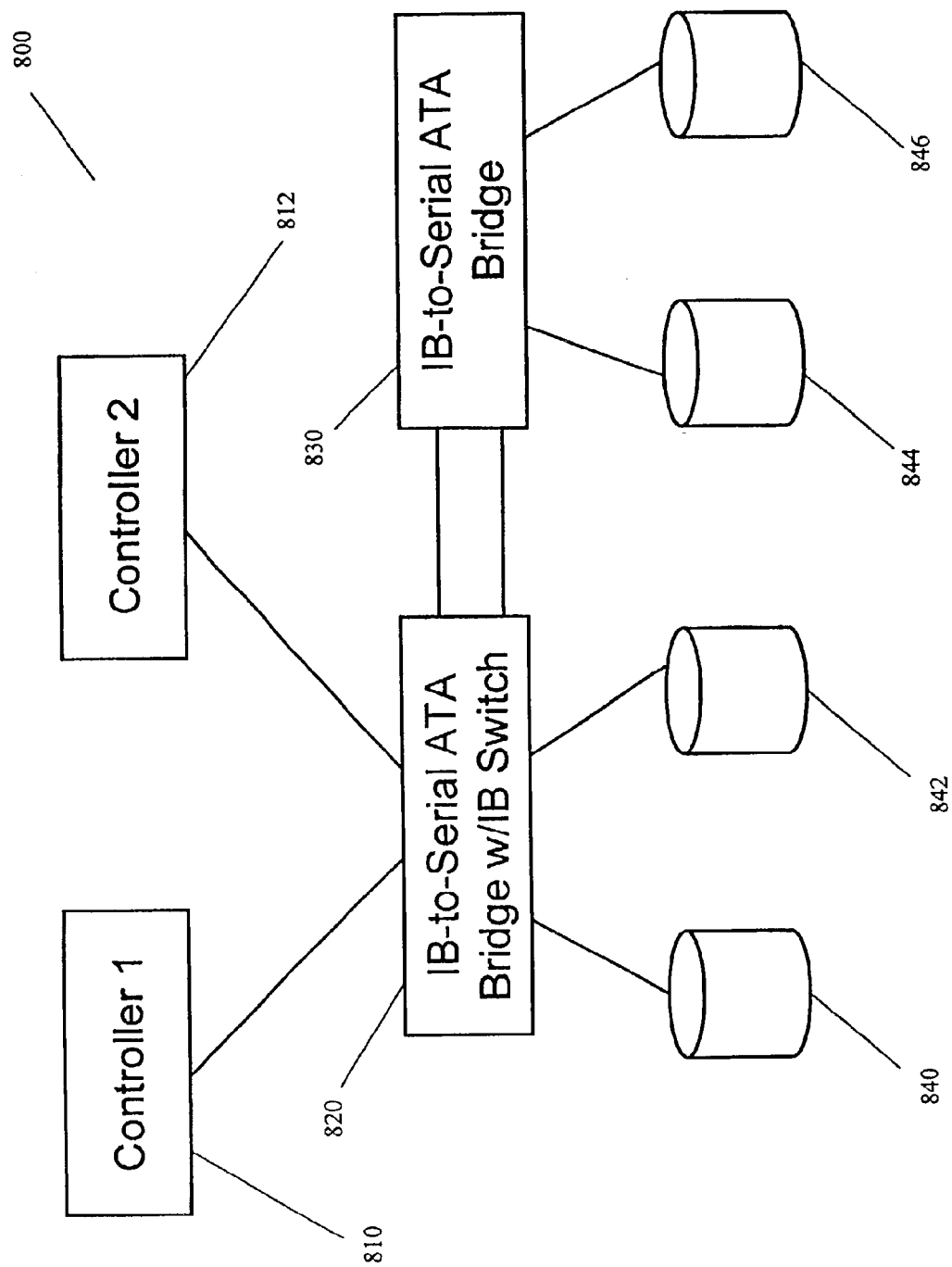
FIG. 8 is a block diagram of another data communication system according to the present invention.

FIG. 8 is a block diagram of another data communication system 800 according to the present invention. In FIG. 8, the system 800 utilizes a bridge having an IB switch 820. Thus, as shown in FIG. 8, either controller 810 or 812 may be coupled to storage devices 840, 842, 844, or 846 through the IB-to-serial ATA Bridge/IB Switch 820 and IB-to-serial ATA Bridge 830.

Figure 9:
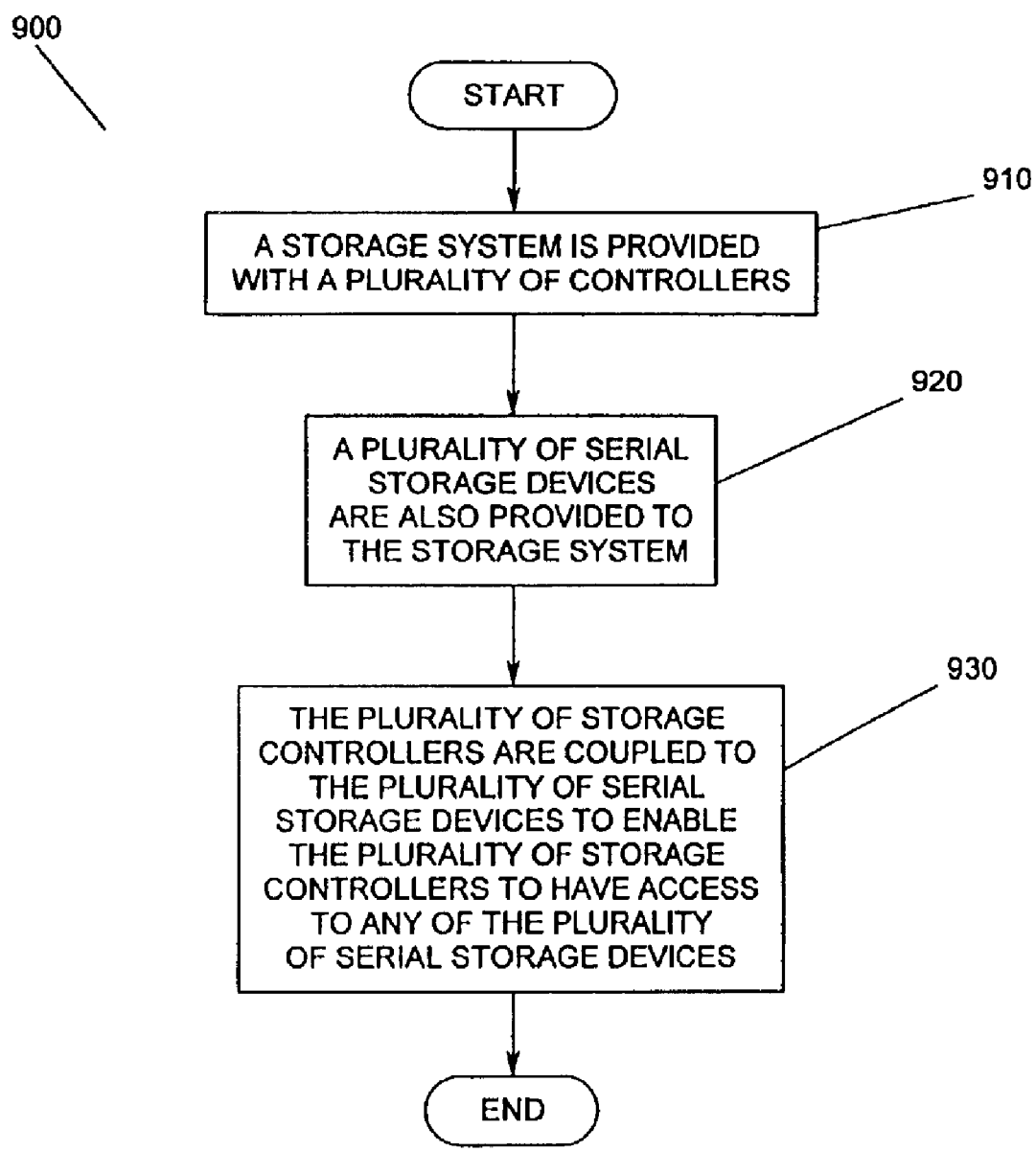
FIG. 9 is a flowchart illustrating a method of improving the scalability of a data communication system according to an embodiment of the present invention.

FIG. 9 is a flowchart 900 illustrating a method of improving the scalability and reliability of a data communication system according to an embodiment of the present invention. A storage system is provided with a plurality of controllers 910. A plurality of serial storage devices are also provided to the storage system 920. The plurality of storage controllers is coupled to the plurality of serial storage devices to enable the plurality of storage controllers to have access to any of the plurality of serial storage devices 930. The plurality of storage controllers are coupled to the plurality of serial storage devices via a switch fabric architecture. The switch fabric architecture between the plurality of storage controllers and the plurality of serial storage devices provides targeted connections between the plurality of storage controllers and the plurality of serial storage devices. The switch fabric architecture may be adapted to direct and coordinate the communication between the controllers and the serial storage devices.

The system may also be improved further through application of InfiniBand® technology to the links, ports, buses and switches associated with the system 950. With Infini-Band® multiple devices can be managed with a single processor and cascaded to create a high speed data communication network. InfiniBand® allows each port to couple to another switch, thus enabling configuration of multiple peripherals that are able to work together for transferring data communication packets.

InfiniBand® increases the accessibility of the ports and switches by a factor 4, 8 or even 12 times. That is, the number of simultaneous connections available is greatly increased and thus, the scalability of the system is vastly increased.

With InfiniBand®, the system is provided with an unlimited number of different of communication routes to complete data transfers and data requests. Even at high volume of controller usage, the system is able to continue to direct and coordinate communication and prevent failure of data requests or transfers being completed. The reliability of the data access network is improved because a single controller or single storage device failure is no longer able to bring down the entire system.

A method and apparatus for increasing the scalability and enhancing the reliability of a data communication system is provided. A data communication system is provided with a bridge that facilitates simultaneous communication of a plurality of controllers with a plurality of serial storage devices. A data communication is provided with a plurality of switches to further increase the reliability and scalability of the system. Application of InfiniBand® further improves the data communication system.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data communication system comprising:
    a plurality of storage devices, each with S-ATA port supporting S-ATA protocol;
    a plurality of storage controllers, each with a serial port supporting a different protocol than S-ATA protocol; and
    a data communication bridge having (a) first ports coupled to respective serial ports of said storage controllers, (b) second ports coupled to respective S-ATA ports of said storage devices, (c) one or more internal buses, (d) a plurality of target channel adapters connected between said one or more buses and respective first ports, said target channel adapters supporting the protocol of said storage controllers, (d) a plurality of S-ATA adapter units connected between said one or more buses and respective second ports, and wherein said one or more buses can interconnect any of said target channel adapters to any of said S-ATA adapter units.

2. A system as set forth in claim 1 wherein said serial ports of said storage controllers are Infiniband (tm) ports and support Infiniband (tm) protocol.

3. A system as set forth in claim 1 further comprising first and second multiport switches, said first switch having third ports connected to said serial ports of one or more of said storage controllers and a fourth port connected to one of said first ports of said bridge, said second switch having fifth ports connected to said serial ports of one or more other of said storage controllers and a sixth port connected to another of said first ports of said bridge, such that any of said serial ports of said storage controllers can be coupled through one of said switches to said bridge.

4. A system as set forth in claim 1 wherein a number of said buses equals or exceeds a number of said second ports to permit simultaneous communication between said storage devices and a like number of storage controllers.

5. A system as set forth in claim 1 wherein each of said S-ATA adapter units comprises S-ATA application, transport, link and physical layers.

6. A system as set forth in claim 4 wherein said one or more buses are local buses and are configured to allow said storage controllers to simultaneously access different storage devices.

7. A data communication system comprising:
    a plurality of storage devices, each with an S-ATA port supporting S-ATA protocol;
    a plurality of storage controllers, each with a serial port supporting a different protocol than S-ATA protocol; and
    a data communication bridge having (a) first ports coupled to respective serial ports of said storage controllers, (b) second ports coupled to respective S-ATA ports of said storage devices, (c) one or more internal buses, (d) a plurality of target channel adapters connected between said one or more buses and respective first ports, said target channel adapters supporting the protocol of said storage controllers, (d) a plurality of S-ATA adapter units connected between said one or more buses and respective second ports; and wherein said one or more buses can interconnect any of said target channel adapters to any of said S-ATA adapter units; and
    first and second multiport switches, said first switch having third ports connected to said serial ports of some of said storage controllers and a fourth port connected to one of said first ports of said bridge, said second switch having fifth ports connected to said serial ports of other of said storage controllers and a sixth port connected to another of said first ports of said bridge, such that any of said serial ports of said storage controllers can be coupled through one of said switches to said bridge.

8. A data communication bridge to interconnect a plurality of storage devices with a plurality of storage controllers, each of said storage devices having an S-ATA port supporting S-ATA protocol, each of said storage controllers having a serial port supporting a different protocol than S-ATA protocol, said bridge comprising:

first ports for coupling to respective serial ports of said storage controllers;

second ports for coupling to respective S-ATA ports of said storage devices;

one or more internal buses;

a plurality of target channel adapters connected between said one or more buses and respective first ports, said target channel adapters supporting the protocol of said storage controllers; and a plurality of S-ATA adapter units connected between said one or more buses and respective second ports; and wherein said one or more buses can interconnect any of said target channel adapters to any of said S-ATA adapter units.

9. A bridge as set forth in claim 8 wherein said serial ports of said storage controllers are Infiniband (tm) ports and support Infiniband (tm) protocol.

10. A bridge as set forth in claim 8 wherein a number of said buses equals or exceeds a number of said second ports to permit simultaneous communication between said storage devices and a like number of storage controllers.

11. A bridge as set forth in claim 8 wherein each of said S-ATA adapter units comprises S-ATA application, transport, link and physical layers.

12. A bridge as set forth in claim 10 wherein said one or more buses are local buses and are configured to allow said storage controllers to simultaneously access different storage devices.

* * * * *